(12) United States Patent
Chang

(10) Patent No.: US 8,072,517 B2
(45) Date of Patent: Dec. 6, 2011

(54) IMAGE CAPTURING DEVICE WITH TWO MOVEABLE CAMERA MODULES

(75) Inventor: Jen-Tsorng Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 234 days.

(21) Appl. No.: 12/630,966

(22) Filed: Dec. 4, 2009

(65) Prior Publication Data

US 2010/0265369 A1 Oct. 21, 2010

(51) Int. Cl.
*H04N 9/09* (2006.01)
*H04N 5/247* (2006.01)
*H04N 5/225* (2006.01)
*G03B 41/00* (2006.01)

(52) U.S. Cl. ........ 348/262; 348/264; 348/373; 396/332; 396/334

(58) Field of Classification Search .......... 348/262–265, 348/373, 374; 396/332–334
See application file for complete search history.

(56) References Cited

U.S. PATENT DOCUMENTS

| 7,856,180 B2 * | 12/2010 | Chishima ................... 396/324 |
| 7,961,234 B2 * | 6/2011 | Viinikanoja et al. .......... 348/264 |
| 2006/0268159 A1 * | 11/2006 | Orimoto et al. .............. 348/373 |

* cited by examiner

*Primary Examiner* — David Ometz
*Assistant Examiner* — Dillon Durnford Geszvain
(74) *Attorney, Agent, or Firm* — Altis Law Group, Inc.

(57) ABSTRACT

An image capturing device includes an adjustment assembly and two camera modules. The adjustment assembly includes a base, a driving member fixed on the base, and two supporting boards. The driving member includes an elastic connecting board having two ends connected to the base, a rigid board fixed to the elastic connecting board facing the base, and a cam rotating unit positioned between the base and the rigid board. The cam rotating unit abuts the rigid board and is rotatable to cause the rigid board to move toward or away from the base. The two supporting boards are attached to the elastic connecting board opposite to the base and spaced apart from each other. The two camera modules are fixed to the two supporting boards respectively.

14 Claims, 4 Drawing Sheets

IMAGE CAPTURING DEVICE WITH TWO MOVEABLE CAMERA MODULES

BACKGROUND

1. Technical Field

The present disclosure relates to imaging technologies and, particularly, to an image capturing device having two moveable camera modules.

2. Description of Related Art

Generally, when synthesizing a panoramic image, an image capturing device having two camera modules is used for capturing two independent sub-images. The two sub-images are then processed to obtain the panoramic image. However, capturing areas of two camera modules are typically un-adjustable independently. However, versatility with this set-up is limited and if a user would like to make changes they are limited to adjusting position of the image capturing device, which is inconvenient.

Therefore, what is needed is an image capturing device which can overcome the limitations described.

DETAILED DESCRIPTION

Figure 1:
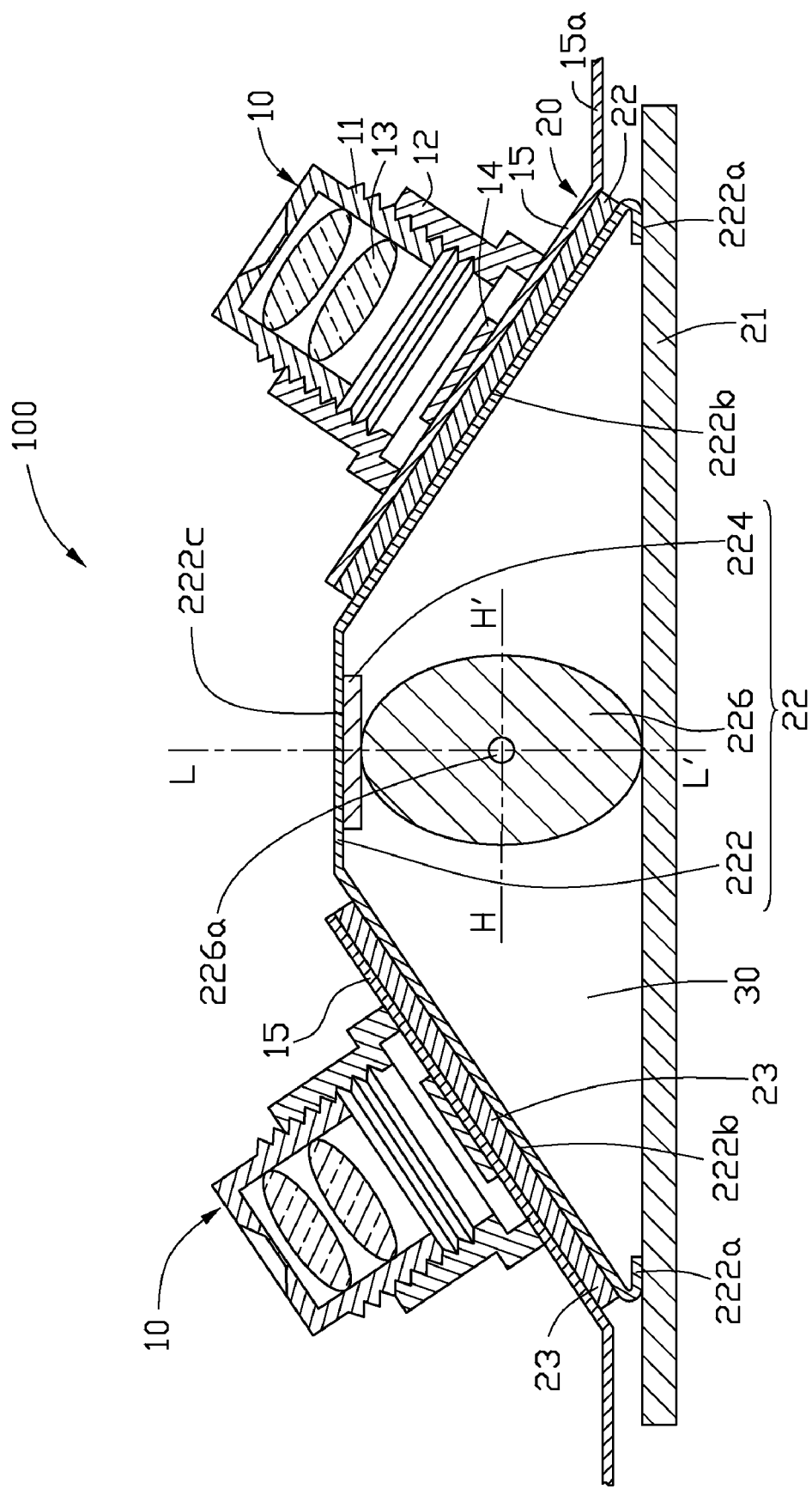
FIG. 1 is a sectional view of an image capturing device, according to a first exemplary embodiment, showing the image capturing device in a first working state.
Figure 2:
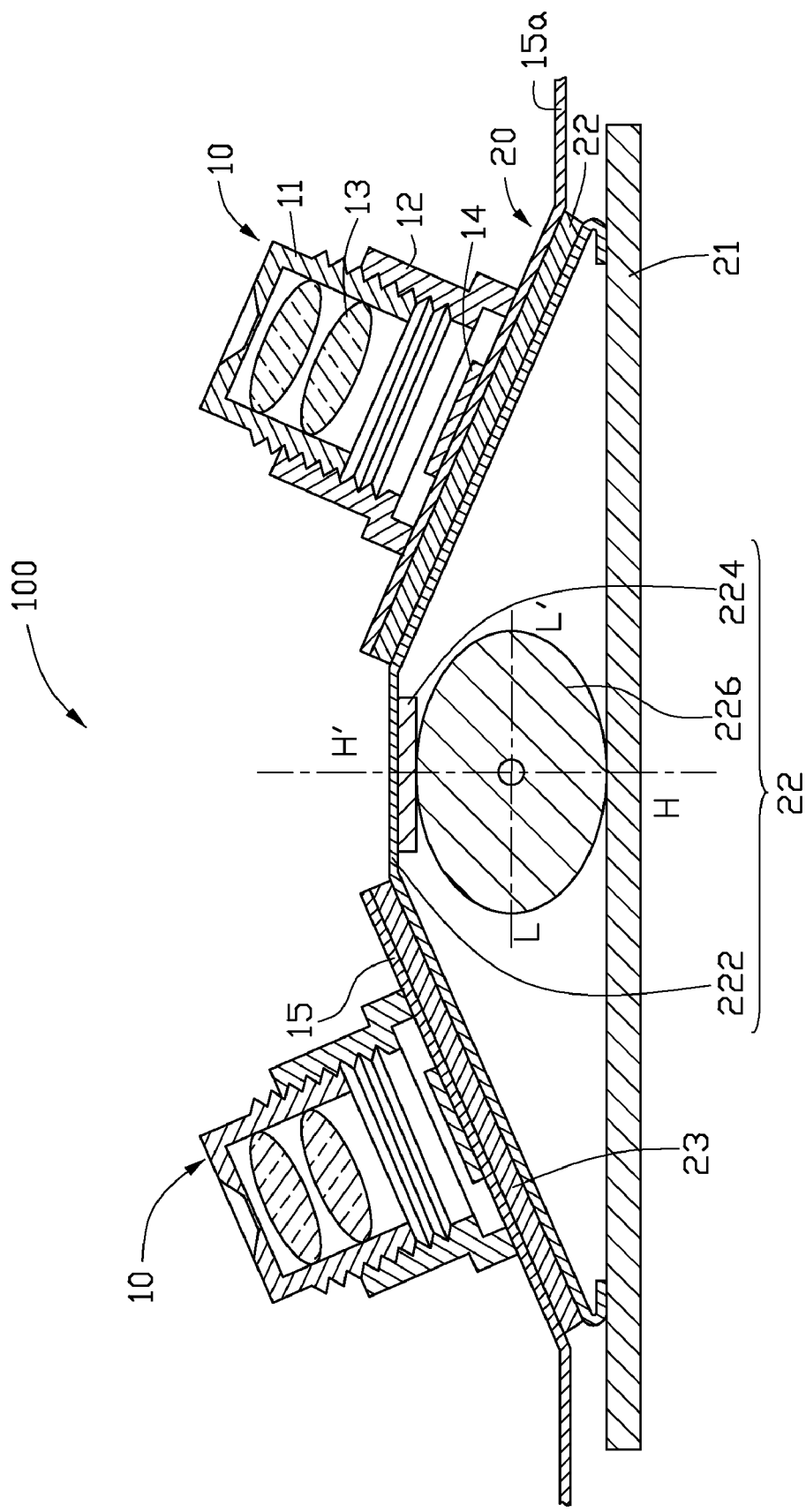
FIG. 2 is similar to FIG. 1, but showing the image capturing device in a second working state.

Referring to FIGS. 1 and 2, an image capturing device 100, according to a first exemplary embodiment, includes two camera modules 10 and an adjustment assembly 20. The two camera modules 10 are positioned on the adjustment assembly 20.

Each camera module 10 includes a lens barrel 11, a holder 12, a group of lenses 13, an image sensor 14, and a circuit board 15 with a connector 15a. The group of lenses 13 includes two lenses and is assembled in the lens barrel 11. The lens barrel 11 is mounted to the holder 12. The holder 12 is assembled with the circuit board 15. The image sensor 14 is positioned on the circuit board 15 and received in the holder 12. The image sensor 14 is electrically connected to the circuit board 15. A sensing area of the image sensor 14 is aligned with the group of lenses 13.

The adjustment assembly 20 includes a base 21, a driving member 22, and two supporting boards 23. The base 21 is made from very hard material, such as mechanically-resistant metal.

The driving member 22 includes an elastic connecting board 222, a rigid board 224, and a cam rotating unit 226.

The elastic connecting board 222 is made from elastic material, such as soft or pliable resin, rubber or plastic. The elastic connecting board 222 includes two fixing portions 222a, two supporting portions 222b, and a connecting portion 222c. The two fixing portions 222a are two opposite ends of the elastic connecting board 222. The two fixing portions 222a are fixed to the base 21 and spaced from each other. The two supporting portions 222b extend from the two fixing portions 222a respectively. The connecting portion 222c connects the two supporting portions 222b to each other.

The rigid board 224 is also made from very hard material, such as mechanically-resistant metal. The rigid board 224 is fixed to the connecting portion 222c and faces the base 21.

The cam rotating unit 226 is also made from very hard material, such as mechanically-resistant metal. A cross section of the cam rotating unit 226 is an ellipse with a major axis LL' and a minor axis HH'. The cam rotating unit 226 includes a rotating shaft 226a passing through the center of the cam rotating unit 226. A manual control lever (not shown) or a rotor (not shown) of a motor (not shown) may be connected to the rotating shaft 226a. The cam rotating unit 226 is positioned on the base 21 and supports the rigid board 224 so that the two supporting portions 222b are inclined relative to the base 21. An approximate trapezoidal space 30 is bounded by the elastic connecting board 222 and the base 21.

The two supporting boards 23 are respectively attached to the two fixing portions 222a outside the space 30. The camera modules 10 are positioned on the two supporting boards 23 respectively. Each circuit board 15 is electrically connected to a processor (not shown) through the connector 15a.

When in use, the cam rotating unit 226 supports the rigid board 224 in a manner that the major axis LL' is substantially perpendicular to the rigid board 224 (see FIG. 1). A first pair of images is captured by the two camera modules 10. If the cam rotating unit 226 rotates with rotation of the rotating shaft 226a, the cam rotating unit 226 supports the rigid board 224 in another manner where the minor axis HH' is substantially perpendicular to the rigid board 224 (see FIG. 2). Therefore, an included angle between each supporting portion 222b and the base 21 decreases. A second pair of images is captured by the two camera modules 10. The two pairs of images are then transmitted by the circuit board 15 to a processor for processing. Accordingly, more pairs of images can be captured by rotating the cam rotating unit 226 to different angles, which is convenient.

Figure 3:
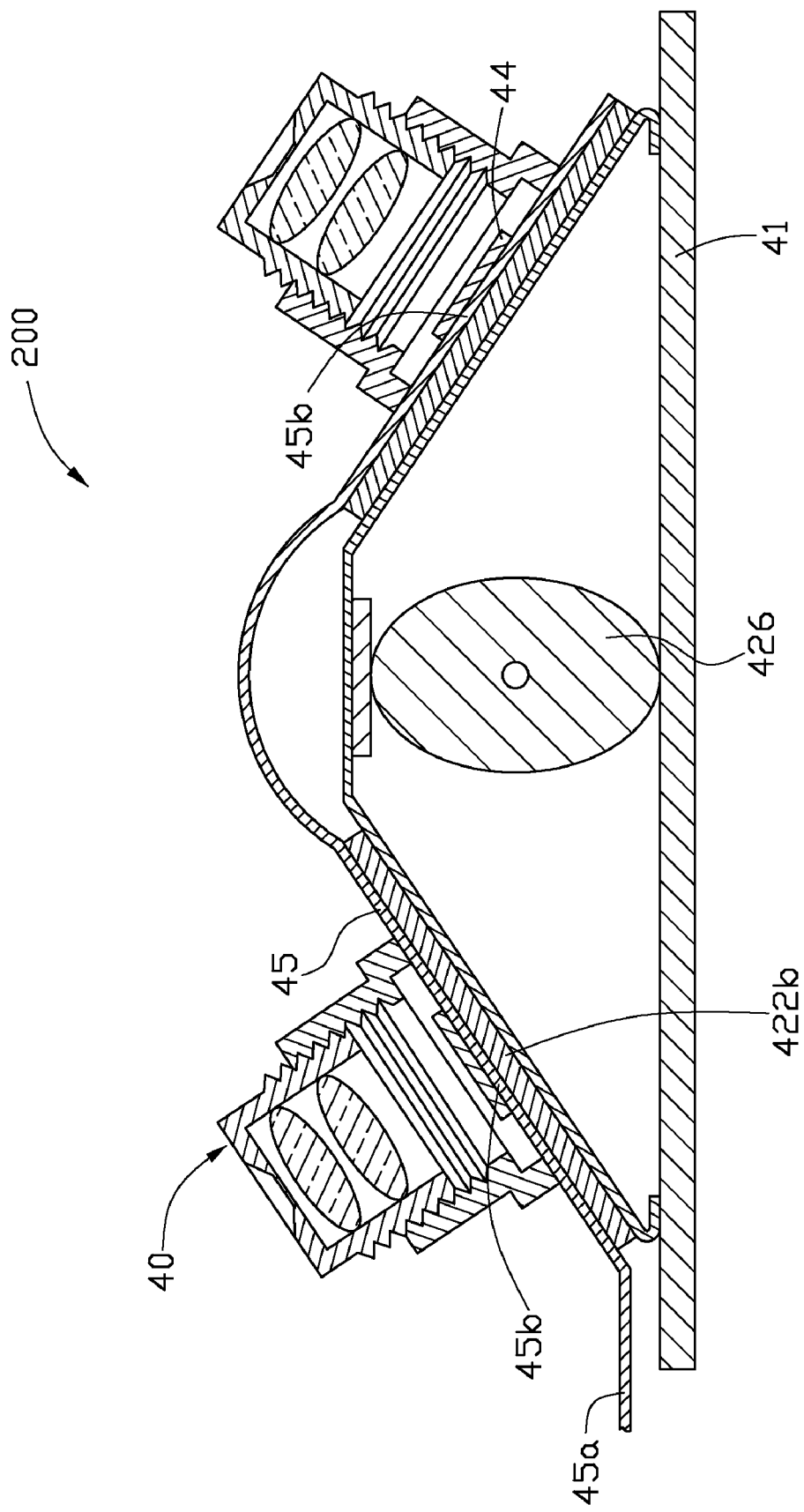
FIG. 3 is a sectional view of an image capturing device, according to a second exemplary embodiment, showing the image capturing device in a first working state.
Figure 4:
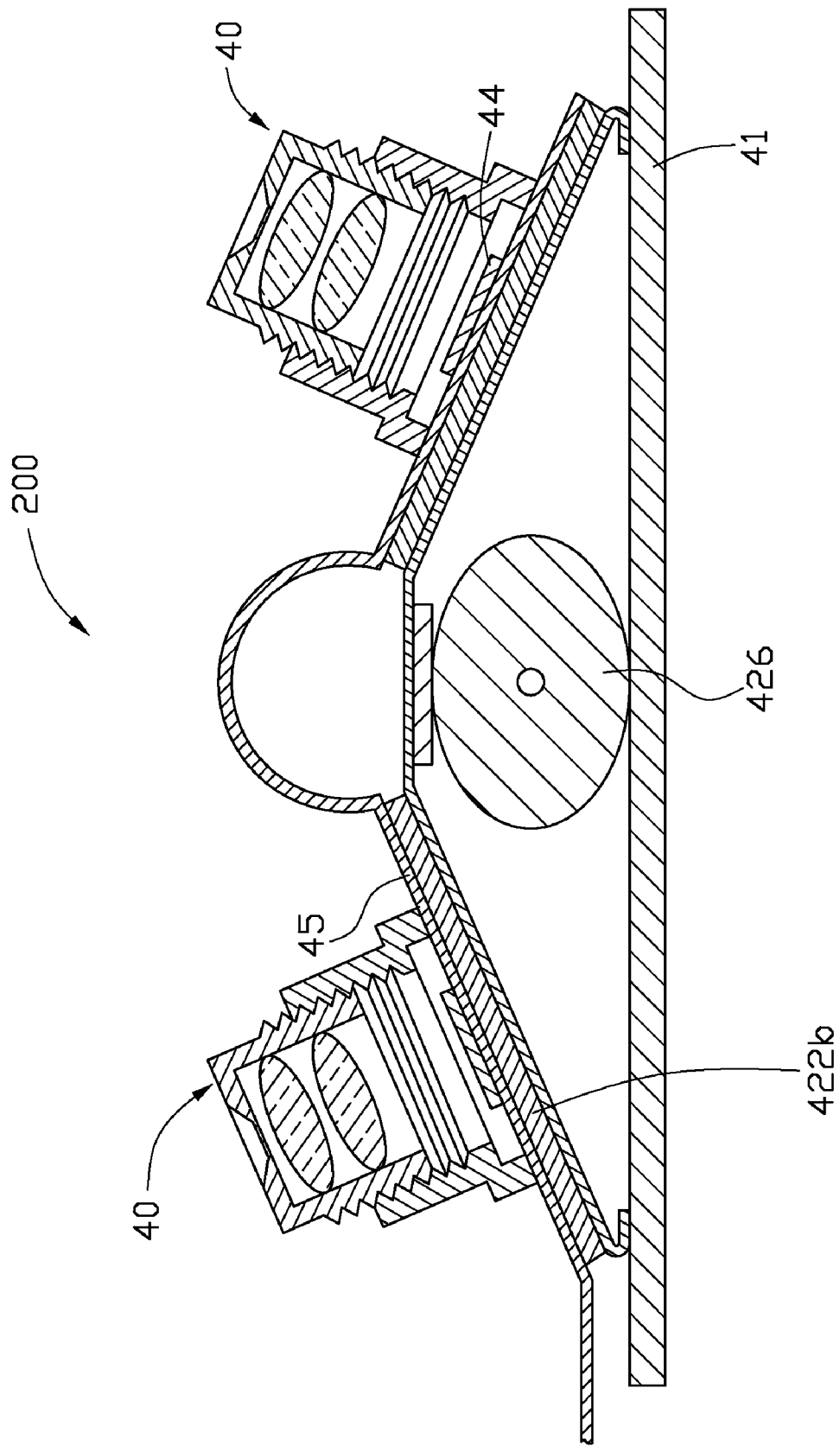
FIG. 4 is similar to FIG. 3, but showing the image capturing device in a second working state.

Referring to FIGS. 3 and 4, an image capturing device 200, according to a second exemplary embodiment, is shown. Differences between the image capturing device 200 of this embodiment and the image capturing device 100 are a flexible circuit board 45 including a connector 45a is used instead of the two circuit boards 15.

Two electrical trace areas 45b are formed on the flexible circuit board 45. The two image sensors 44 are positioned on the flexible circuit board 45 and electrically connected to the two electrical trace areas 45b respectively. The connector 45a may be connected to a processor (not shown). When the cam rotating unit 426 rotates to change the included angle between each supporting portion 422b and the base 41, the flexible circuit board 45 deforms accordingly.

Advantages of the image capturing unit 200 of the second exemplary embodiment are similar to those of the image capturing unit 100 of the first exemplary embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An image capturing device, comprising:
   an adjustment assembly comprising:
   a base;

a driving member fixed on the base, the driving member comprising an elastic connecting board having two ends connected to the base, a rigid board fixed to the elastic connecting board facing the base, and a cam rotating unit positioned between the base and the rigid board, the cam rotating unit abutting the rigid board and being rotatable to cause the rigid board to move toward or away from the base; and two supporting boards attached to the elastic connecting board opposite to the base and spaced apart from each other; and two camera modules fixed to the two supporting boards respectively.

2. The image capturing device as claimed in claim 1, wherein the elastic connecting board is made from elastic material.

3. The image capturing device as claimed in claim 2, wherein the elastic connecting board is made from resin, rubber or plastic.

4. The image capturing device as claimed in claim 1, wherein the rigid board is made from hard material.

5. The image capturing device as claimed in claim 4, wherein the rigid board is made from mechanically-resistant metal.

6. The image capturing device as claimed in claim 1, wherein the cam rotating unit is made from mechanically-resistant metal.

7. The image capturing device as claimed in claim 1, wherein the two supporting boards are made from mechanically-resistant metal.

8. The image capturing device as claimed in claim 1, wherein the elastic connecting board comprises two fixing portions at opposite ends thereof, two supporting portions, and a connecting portion; the two fixing portions are fixed to the base and spaced from each other; the two supporting portions extend from the two fixing portions respectively; the connecting portion interconnects the two supporting portions.

9. The image capturing device as claimed in claim 8, wherein the two supporting boards are attached to the two supporting portions opposite to the base respectively, and the rigid board is fixed to the connecting portion facing the base.

10. The image capturing device as claimed in claim 9, wherein the cross section of the cam rotating unit is an ellipse with a major axis and a minor axis.

11. The image capturing device as claimed in claim 10, wherein the cam rotating unit comprises a rotating shaft passing through the center thereof; the cam rotating unit is configured for rotating with rotation of the rotating shaft.

12. The image capturing device as claimed in claim 11, wherein each camera module comprises a circuit board with a connector, the circuit boards are positioned on the two supporting boards respectively, and each circuit board is electrically connected to a processor through the corresponding connector.

13. The image capturing device as claimed in claim 11, wherein the two camera modules comprise a flexible circuit board with a connector and an image sensor; two electrical trace areas are formed on the flexible circuit board; the flexible circuit board is positioned on the elastic connecting board; each image sensor is electrically connected to the respective electrical trace area; and the flexible circuit board is electrically connected to a processor through the connector.

14. An image capturing device, comprising:

a base;

two elastic board portions each having a first fixed end fixed to the base, and an opposing second end;

a rigid board coupled and arranged between the second ends the elastic board portions;

a cam rotating unit positioned between the base and the rigid board, the cam rotating unit abutting the rigid board and being rotatable to cause the rigid board to move toward or away from the base, thereby the second ends rotating about the respective first fixed ends; and two camera modules mounted to the elastic board portions respectively, each camera module having an optical axis perpendicular to the respective elastic board portion.

* * * * *